April 4, 1967            J. MARTIN            3,312,430

MULTIPLE EJECTION SEAT INSTALLATIONS

Filed Sept. 10, 1965            5 Sheets-Sheet 1

Inventor
JAMES MARTIN

By Kurt Kelman
AGENT

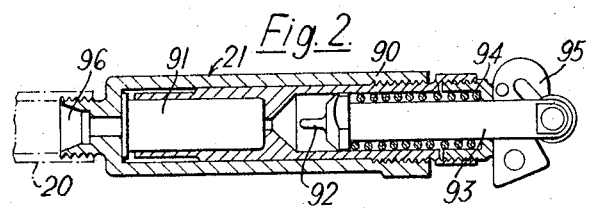
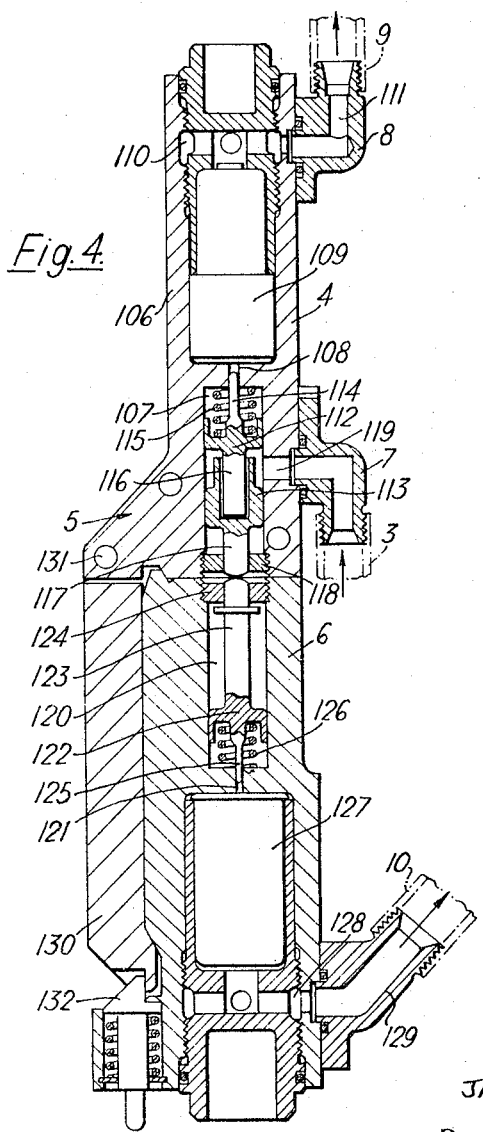

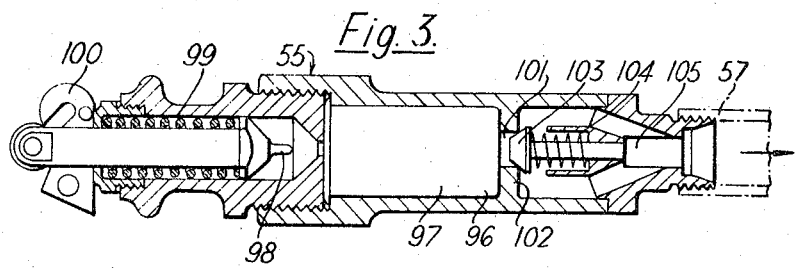
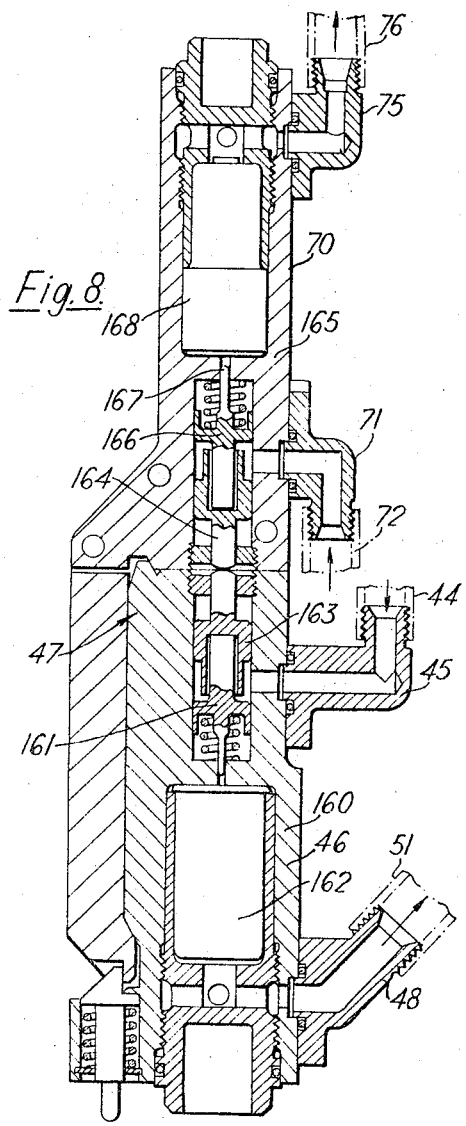

Inventor
JAMES MARTIN
By Kurt Kelman
AGENT

April 4, 1967 J. MARTIN 3,312,430
MULTIPLE EJECTION SEAT INSTALLATIONS
Filed Sept. 10, 1965 5 Sheets-Sheet 5
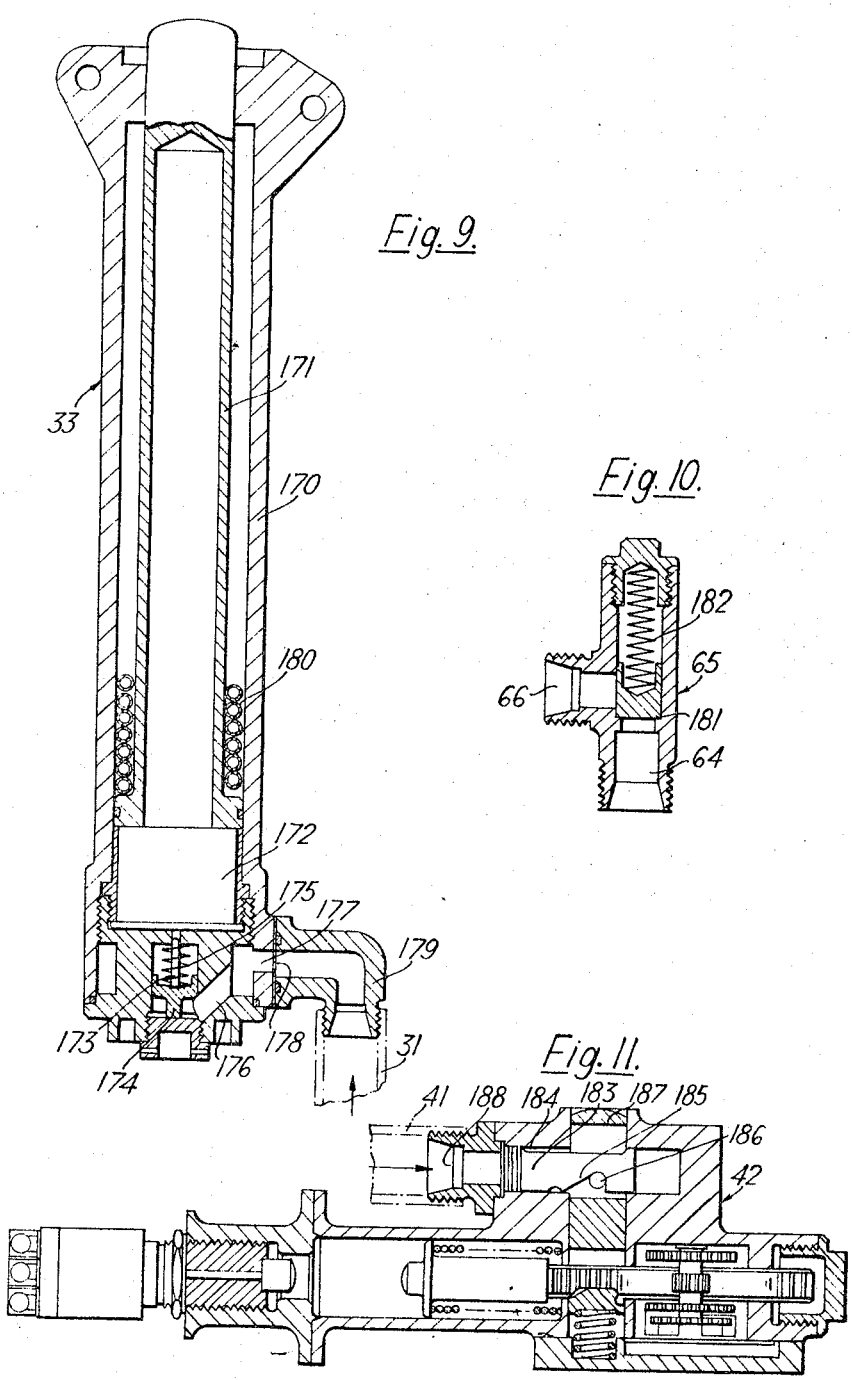
Inventor
JAMES MARTIN
By Kurt Kelman
AGENT

United States Patent Office 3,312,430
Patented Apr. 4, 1967

3,312,430
MULTIPLE EJECTION SEAT INSTALLATIONS
James Martin, Southlands Manor, Southlands Road,
Denham, near Uxbridge, England
Filed Sept. 10, 1965, Ser. No. 486,470
Claims priority, application Great Britain, Sept. 11, 1964,
37,370/64; Nov. 27, 1964, 48,232/64
7 Claims. (Cl. 244—122)

This invention concerns multiple ejection seat installations for aircraft, spacecraft or the like (all hereinafter referred to as "aircraft") and, in particular, systems interconnecting the seats of such installations for causing initiation of ejection of said seats and/or for controlling the performance of said seats.

In a single seat aircraft provided with an ejection seat it is, of course, the occupant of the seat who initiates ejection of the seat from the aircraft, but in aircraft equipped with two or more ejection seats experience has shown that it is desirable that the ejection of each seat should be initiated in a single operation by, for instance, the captain of the aircraft, because in present-day high speed aircraft an emergency may give rise to a situation in which no time is available for communication with the personnel or aircrew concerned.

Furthermore, where provision is made for the captain of the aircraft to eject the crew, provision should also be made whereby such personnel other than the aircraft captain may eject themselves without ejecting the captain of the aircraft.

For the sake of convenience, the ejection seat for the captain of the aircraft, or for any other crew member of such aircraft whose decision to eject himself from the aircraft is to involve ejection of all other ejection seat-equipped personnel, will be referred to as the "captain's ejection seat"; any other ejection seat of the installation will, for the sake of convenience, be referred to as a "crew ejection seat."

According to this invention, there is provided an ejection seat installation including the captain's ejection seat and one or more crew ejection seats, each of said seats having mechanism for initiating ejection thereof, the initiating mechanism of the captain's seat co-operating with the initiating mechanism of the or each crew ejection seat whereby initiation of ejection of said captain's seat causes initiation of ejection of the or each crew seat, the initiating mechanism of the or each crew seat being actuated by the occupant thereof to initiate ejection of the seat individually and without ejection of any other seat of the installation.

The co-operation between the initiating mechanism of the captain's ejection seat and that of the or each crew ejection seat may be accomplished by means of pressure fluid generated by actuation of a part of the mechanism of the captain's ejection seat, such generated pressure fluid being transmitted through a conduit associated with the initiating mechanism of the or each crew ejection seat.

Very conveniently, actuation of said part of the initiating mechanism of the captain's seat will, in addition to causing the initiating mechanism of the or each crew ejection seat to be actuated, additionally actuate canopy unlocking and jettisoning mechanism such that any cockpit canopy or canopies positioned above the ejection seats of the aircraft are jettisoned.

It will be appreciated that said system may be arranged so that, after actuation of the initiating mechanism of the captain's ejection seat, ejection of all the ejection seats of the installation will occur simultaneously. However, according to another feature of the invention, said system may provide for sequential ejection of the seats of the installation upon actuation of the initiating mechanism of the captain's ejection seat and, where more than one cockpit canopy is positioned above the ejection seats, said system may provide for suitable sequential jettisoning of such canopies.

It should be noted that the conduit for carrying pressure fluid of such a system will be mounted in part on the ejection seat(s) and in part on the aircraft and interconnection of said conduit parts may be made by one or more connectors.

According to yet a further feature of this invention, said pressure fluid (either generated directly or indirectly as a result of actuation of the initiating mechanism of the captain's ejection seat) may cause actuation of various mechanisms for positioning the captain and the occupant of the or each crew ejection seat of the installation correctly for safe ejection prior to ejection of the seat from the aircraft. Such mechanisms may include, for example, the harness retraction mechanism of my co-pending Patent No. 3,215,376, and the head-restraining mechanism of my co-pending Patent No. 3,214,118.

Furthermore, and according to a still further feature of this invention, actuation of said initiating mechanism of the captain's ejection seat may initiate ejection of a crash data recorder.

In order that this invention may be more readily understood a multiple ejection seat installation including two ejection seats positioned one behind another in an aircraft will now be described by way of example and with reference to the accompanying drawings in which:

FIGURE 2 is a vertical medial sectional view of a typical pressure fluid generating device for causing actuation of the initiating mechanism of one or both of the ejection seats of the installation;

Figure 5:
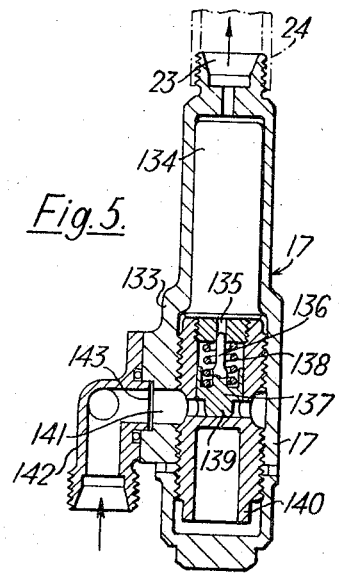
Figure 6:
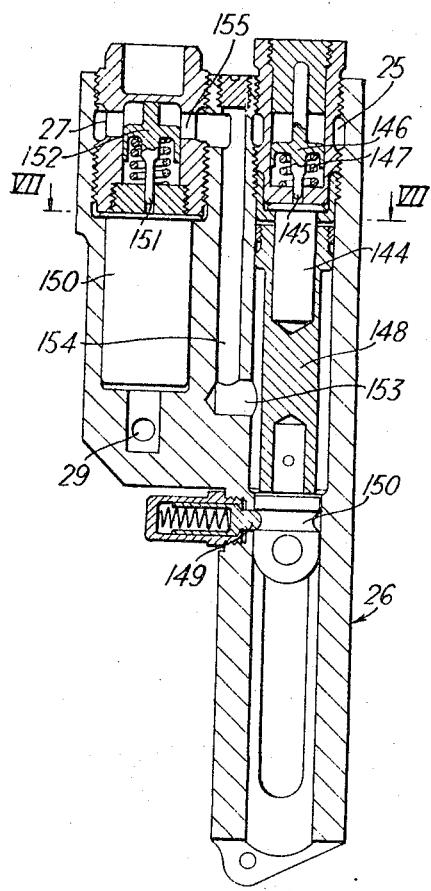
Figure 7:
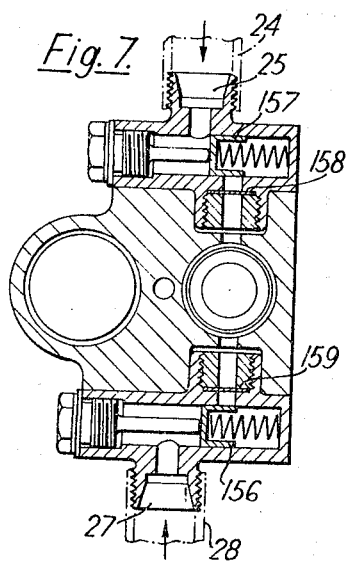

FIGURE 3 is a vertical medial sectional view through a pressure fluid generating device which includes a non-return valve to prevent accidental firing thereof as a result of pressure fluid generated by means of another pressure fluid generating device in the system, such illustrated pressure fluid generating device being provided for initiating canopy unlocking and jettisoning mechanism of the cockpit canopy above said crew ejection seat;

FIGURE 4 is a vertical medial sectional view through a coupling for connecting the parts of the initiating mechanisms of the ejection seats which lie on the aircraft with the parts of such initiating mechanisms which lie on the ejection seats, this coupling being constructed for use in conjunction with the captain's ejection seat rather than the crew ejection seat;

FIGURE 5 is a vertical medial sectional view through a booster unit for generating pressure fluid, such booster unit being adapted to be actuated by pressure fluid;

FIGURE 6 is a vertical medial sectional view through mechanism for controlling unlocking of the, or one of the canopies over said ejection seat installation;

FIGURE 7 is a section of the line VII—VII of FIGURE 6;

FIGURE 8 is a coupling very similar to the coupling of FIGURE 4, this coupling being adapted for use in conjunction with the crew ejection seat rather than the captain's ejection seat;

FIGURE 9 is a vertical medial sectional view through a canopy jettisoning ram for forcing an unlocked canopy from an aircraft;

FIGURE 10 is a vertical medial sectional view through a typical construction on non-return valve included in said system; and FIGURE 11 is a crash data recorder time delay unit for initiating ejection of a crash data recorder.

Figure 1:
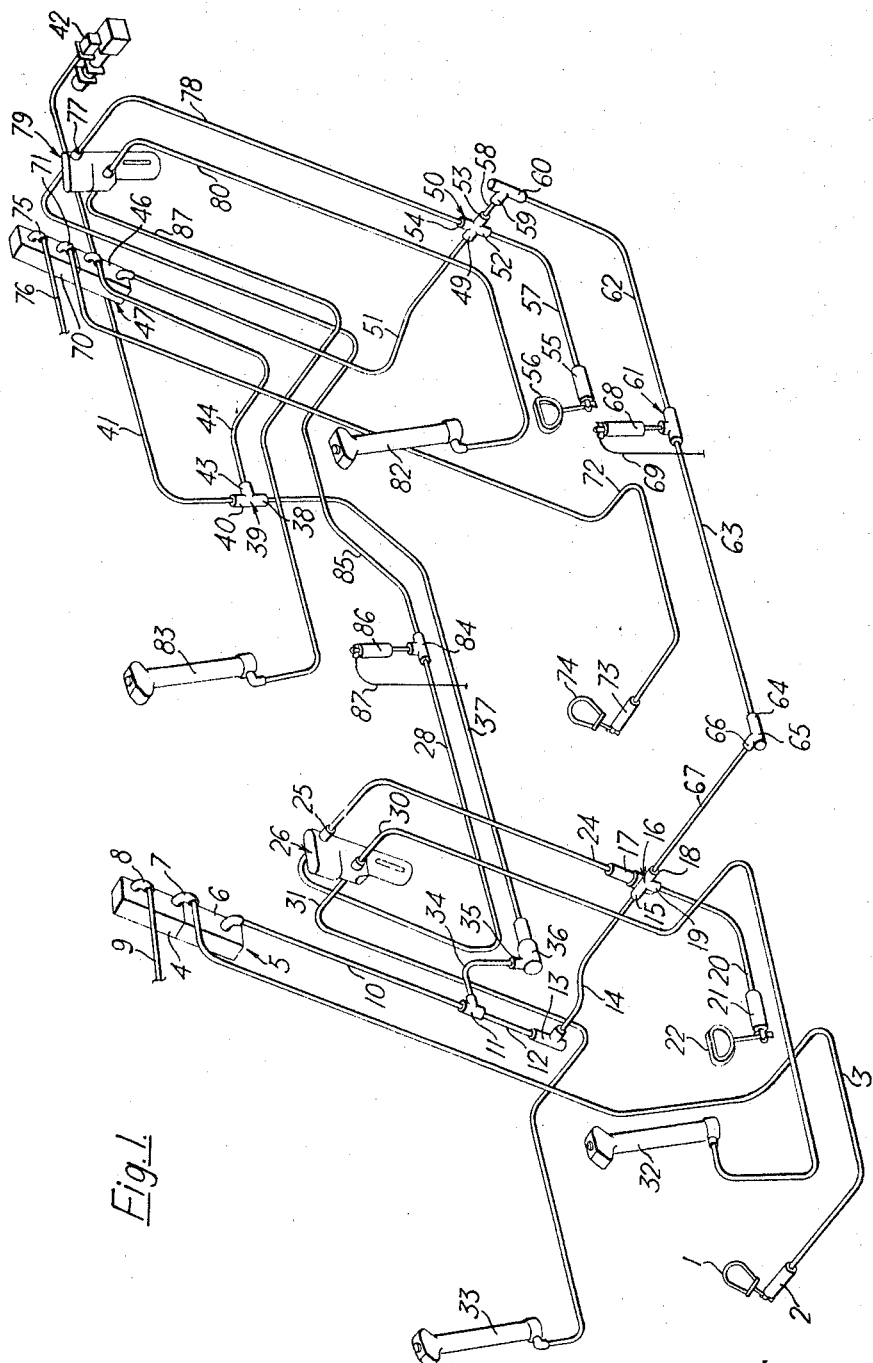
FIGURE 1 is a perspective view showing diagrammatically the initiating mechanisms of two ejection seats, namely the captain's ejection seat and a crew ejection seat, such an arrangement permitting both ejection seats to be ejected from an aircraft sequentially on actuation of the initiating mechanism of the captain's ejection seat.

The ejection seat installation illustrated in FIGURE 1 includes an actuating circuit having a first branch and a second branch, shown herein as a pressure fluid circuit. A first operating means, which is illustrated as handle 1, is operable from the captain's seat for actuating the first branch of the circuit and thus to initiate an ejection mechanism for the captain's ejection seat. In the illustrated embodiment, the handle 1 is operable to generate pressure fluid in a first pressure fluid generating device 2 (see FIG. 2) in the first branch of the circuit. The generated pressure fluid flows into the first branch through its conduit 3 and an inlet port shown as elbow joint 7 of a first coupling 5 receives the pressure fluid from device 2 through the conduit 3 which is connected to the joint. The coupling comprises an ejection seat part 4 and an aircraft part 6 releasably connected to each other (see FIG. 4). The ejection seat part 4 is provided with an outlet constituted by an elbow joint 8 which is connected by means of another first branch conduit 9 firstly to pressure fluid operable mechanisms for positioning the captain in his ejection seat correctly prior to ejection of the seat from the aircraft and thence to ejection gun initiating mechanism. The said mechanisms for positioning the captain in his seat may, very conveniently, include the harness retraction mechanism and head-restraining mechanism, respectively described in my co-pending Patents Nos. 3,215,376 and 3,214,118. The positions of such mechanisms have not been shown in FIGURE 1 to avoid over-complication of such drawing. A portion of the conduit 9 is, however, illustrated.

Connected to the aircraft part 6 of the coupling 5 is a further first branch conduit 10 which passes to a T-junction 11, one exit of this T-junction 11 being connected by a pressure fluid delivery conduit 12 to the inlet port of a non-return valve 13 (see FIG. 10), the outlet port thereof being connected by pressure fluid delivery conduit 14 to one inlet port 15 of a junction unit generally designated 16 associated with a booster unit 17 (see FIG. 5) for generating a supply of pressure fluid. The said junction unit 16 is also provided with two further inlet ports 18, 19.

Connected to the inlet port 19 is a conduit 20 which is closed at its free end by a pressure fluid generating device 21 (see FIG. 2) actuatable by a manually operable lever 22.

The booster unit 17 is provided with an inlet port 23 which is connected by means of a pressure fluid delivery conduit 24 to an inlet port 25 of a canopy unlocking mechanism 26 (see FIGS. 6 and 7) for unlocking, prior to jettisoning, the cockpit canopy covering the captain's ejection seat. This mechanism 26 is provided with a port 27 which is connected by means of a conduit 28 to mechanism to be described more fully hereinafter.

The said canopy unlocking mechanism 26 is also provided with an outlet port 29 which is connected to first branch conduits 30, 31 which respectively are connected to canopy jettisoning rams 32, 33 (see FIG. 9) for causing jettisoning of the canopy covering the captain's ejection seat after it has been unlocked.

Referring now to the T-junction 11, the second outlet port thereof is connected, by means of a first branch conduit 34, to the inlet port 35 of a booster unit 36 for generating pressure fluid. The outlet port of this booster unit 36 (which is very conveniently substantially identical to the booster unit 17) is connected by means of yet another first branch conduit 37 to an inlet port 38 of a T-junction 39, one of the outlet ports 40 of this T-junction 39 being connected by means of a conduit 41 to the inlet port of a time delay unit 42 of a crash data recorder (not shown), such crash data recorder time delay unit 42 being shown in more detail in FIGURE 11.

A second outlet port 43 of the junction unit 39 is connected, by means of a first branch conduit 44, to an inlet port 45 of the aircraft part 46 of a second coupling generally designated 47 (see FIG. 8) and arranged in series with the first coupling 5 in the first branch of the actuating circuit. This aircraft part 46 of the coupling 47 is provided with an outlet port 48 which is, in turn, connected to an inlet port 49 of a junction unit 50 by means of a pressure fluid delivery conduit 51. This junction unit 50 includes inlet ports 52, 53 and an outlet port 54.

The inlet port 52 is connected to a pressure fluid generating device 55 operable by a lever 56 by means of a conduit 57, such device 55 being shown in detail in FIGURE 3 and described in more detail hereinafter.

The other inlet port 53 is connected by means of a conduit 58 to the outlet port 59 of a non-return valve 60, an inlet port in this non-return valve 60 being connected to a T-junction 61 by means of a conduit 62. This T-junction 61 is also connected by means of a conduit 63 to an inlet port 64 of a non-return valve 65 which has its outlet port 66 connected by means of a conduit 67 to the inlet port 18 of the junction unit 16.

The T-junction 61 is connected to a pressure fluid generating device 68 adapted to be initiated by means of actuation of a manually operable handle (not shown) positioned on the exterior of the aircraft, such handle being associated with the pressure fluid generating device 68 by means of a cable 69.

The coupling 47 includes an ejection seat part 70 and such part 70 has an inlet port 71 in the form of an elbow joint which is connected by means of a second branch conduit 72 to a second pressure fluid generating mechanism 73 which is adapted to be initiated if a crew ejection seat firing handle 74 is actuated, this handle constituting a second operating means operable from the crew ejection seat for actuating the second branch of the circuit and thus to initiate the ejection initiating mechanism of the crew ejection seat. The part 70 of the coupling 47 is also provided with an outlet port 75 which is first connected, by means of a conduit 76, to equipment for positioning the occupant of the crew ejection seat prior to ejection of such seat from the aircraft and then to the crew seat ejection gun initiating mechanism. Such mechanisms may include a retraction mechanism and head-restraining mechanism of the kind referred to with reference to the conduit 9.

The outlet port 54 of the junction unit 50 is connected to an inlet port 77 of a canopy unlocking mechanism 79 by means of a conduit 78. This canopy unlocking mechanism 79 is very similar in construction to the canopy unlocking mechanism 26 and is accordingly provided with an outlet port which is connected to two conduits 80, 81 which are, in turn, connected to canopy jettisoning rams 82, 83 for jettisoning the canopy normally covering the crew ejection seat after it has been unlocked by operation of a plunger in the unlocking mechanism 79.

The said canopy unlocking mechanism 79 is directly connected to the canopy unlocking mechanism 26 by means of the conduit 28 connected to the port 27 of the mechanism 26 which is connected by means of a T-junction 84 to a conduit 85 which enters the port of the mechanism 79 corresponding to the port 27 of the mechanism 26. One branch of the said T-junction 84 is connected to a pressure fluid generating device 86 which is identical in construction to the pressure generating device 68, this pressure generating device 86 being initiated by a handle (not shown) positioned on the exterior of the aircraft and being connected to the pressure fluid generating device 86 by a cable 87.

The constructions of the various major components of this system will now be described in more detail with respect to FIGURES 2 to 11.

FIGURE 2 shows the pressure fluid generating device 21 which comprises a cylindrical body 90 which is adapted to receive a gas-generating cartridge 91 having a percussion initiating cap which is adapted to be struck by a firing pin 92 carried by a piston 93. This piston 93 is adapted to be spring-biassed towards a cartridge initiating position by a helical compression spring 94 which is energized by compression as a result of withdrawal of the piston 93 partially from the body 90 under the influence of a sear 95, such sear being adapted to be withdrawn from between a bifurcated portion of said piston 93 by lifting of the handle 22. Once the helical compression spring 94 has been energized, complete withdrawal of the sear 95 allows the compression spring to move the piston 93 and the firing pin 92 into a position where such pin 92 strikes the cartridge 91 and gas generated thereby is emitted through an outlet port 96.

The pressure fluid generating devices 2, 21, 68, 73 and 86 may be of this construction.

FIGURE 3 depicts the pressure fluid generating device 55. This device 55 is very similar in construction to the pressure fluid generating device shown in FIGURE 2. However, this device 55 includes a non-return valve.

The device 55 comprises a body 96 housing a cartridge 97 including a percussion initiating cap adapted to be struck by a firing pin 98, such pin 98 being adapted to strike such cap under the influence of a compression spring 99 energized by withdrawal of a sear 100. Pressure fluid generated by said cartridge 97 flows through an aperture 101 in a wall 102 of the housing 96. This aperture 101 is adapted to be closed by a frusto-conical shaped valve member 103 which is normally retained against its seat in an aperture-closing position by a helical compression spring 104. However, pressure fluid generated by the cartridge overcomes said spring 104 and this is thus free to escape from the body 96 past the valve member 103 and out of the device 55 through an outlet port 105 into the conduit connected thereto, namely the conduit 57.

The valve member 103 ensures that pressure fluid in the conduit 57 which has been generated by another pressure fluid generating device cannot enter the body 96, so that there is no likelihood of the cartridge 97 being fired accidentally.

The coupling shown in FIGURE 4 is the coupling associated with the captain's ejection seat which is generally designated 5. This coupling 5 comprises an ejection seat part 4 and an aircraft part 6. The ejection seat part 4 comprises a body 106 which is provided with a central axial main bore extending into the body approximately midway along the length thereof. The other end of the body 106 is counterbored at 107 and this bore and counterbore, which are coaxial, are connected to one another by a coaxial narrow bore 108.

The main bore houses a pressure fluid source in the form of a gas-generating cartridge 109 which is provided with a percussion-initiating cap which lies adjacent the bore 108. Pressure fluid generated by the cartridge 109 escapes from the bore through an annular channel 110 which communicates with a bore 111 in the elbow joint 8 connected to the conduit 9.

The counterbore 107 houses a piston arrangement including two pistons, the first piston 112 and a second piston 113. The piston 112 carries a firing pin 114 which is adapted to enter said narrow bore 108. A helical compression spring 115 serves to bias said pin 114 and the piston 112 away from the cartridge 109.

The said piston 112 is provided with a projection 116 which normally lies in contact with a recess in the piston 113. This piston 113 carries, on its end remote from the piston 112, a projection 117 which terminates at the mouth of the counterbore 107. An annular guide 118 is provided at the mouth of the counterbore 107 to guide this projection 117. A transverse bore 119 passes through the wall of the body 106 into the counterbore 107 and constitutes an inlet port which is connected to the joint 7 which is, in turn, connected to the conduit 3. Sandwiched between the joint 7 and the port 119 is a frangible diaphragm.

The aircraft part 6 of the coupling is also provided with a main bore and a counterbore, such counterbore being designated 120, and the main bore and counterbore 120 being coaxial and being interconnected by a small bore 121. The counterbore 120 houses a piston 122 which is formed with a projecting portion 123 which rides in a guide 124 positioned at the mouth of this counterbore 120.

The piston 122 carries a firing pin 125 which is adapted to ride in the small bore 121. A helical compression spring 126 is provided to bias the piston 122 away from the small bore 121 which communicates with the main bore which houses a gas-generating cartridge 127. Pressure fluid generated by such gas-generating cartridge passes from the main bore through an annular outlet 128 into an outlet port 129 formed by a cranked joint which is connected to the conduit 10. Said two parts of the coupling are adapted to be normally secured to one another by means of a lever 130 pivotally connected at 131 to the ejection seat part 4 and being retained adjacent the part 6 by a releasable detent 132.

Referring now specifically to the construction of the booster unit 17, it will be seen from FIGURE 5 that such booster unit 17 comprises generally a tubular body 133 in which a gas-generating cartridge 134 is positioned. This gas-generating cartridge 134 is provided with a percussion initiating cap which lies adjacent one end of a narrow bore 135 within the body 133 which serves to guide a firing pin 136 on a piston 137, such piston 137 being axially slidable within said body 133 and being biased in a direction away from said cartridge 134 by a helical compression spring 138. The compression spring 138 causes an abutment 139 on such piston to engage a plug 140 in the end of said tubular body remote from said cartridge.

The said body 133 is provided with an inlet port 141 which lies in the wall of the tubular body at a position between the plug 140 and the piston 137. Such inlet port 141 is connected to an elbow joint 142 which is, in turn, connected to the outlet port of the junction unit 16. The end of the housing 133 provided with the gas-generating cartridge 134 is provided with the outlet port 23 which is connected to the conduit 24.

Sandwiched between the elbow joint 142 and the port 141 is a frangible diaphragm 143, the purposes of such frangible diaphragm being referred to hereinafter. Booster unit 36 is identical with unit 17, except that joint 142 is not required.

Referring now more specifically to the construction of the mechanism for unlocking the canopy over the captain's ejection seat prior to jettisoning of such canopy, it will be seen from FIGURES 6 and 7 that such mechanism comprises a body provided with a pair of bores, one end of the first of these bores communicating with the inlet port 25 and one end of the second of said bores communicating with the inlet port 27. The bore communicating with the inlet port 27 also communicates with the outlet port 29. The first bore houses a gas-generating cartridge 144 which is adapted to be initiated as a result of a firing pin 145 striking a percussion-initiating cap on said cartridge 144. This firing pin 145 is carried by a piston 146 which is spring-biassed away from said cartridge by a helical compression spring 147.

The body also includes a plunger 148 which is normally retained in a position adjacent the end of the cartridge remote from the percussion-initiating cap thereof by means of a spring-biassed detent 149 which engages a slot 150 in such plunger 148. The end of the plunger remote from the gas-generating cartridge is apertured and is pivotally connected to a torque shaft or suitable linkage so that movement of such plunger 148 in a direction away from said cartridge 144 causes movement of such torque shaft or appropriate linkage to unlock catches normally securing the canopy to the aircraft in a position above the captain's ejection seat prior to jettisoning thereof.

The said second bore is also provided with a gas-generating cartridge 150 having a percussion-initiating cap which is adapted to be struck by a firing pin 151 carried by a piston 152 in a similar manner to the aforementioned piston 146. A port 153 is provided in the first bore which would be uncovered by movement of said plunger 148 away from the cartridge 144, and this port 153 communicates with a passage 154 which leads to a further port 155 in the wall of said second bore at a position above said piston 152. The arrangement is such that pressure fluid generated by the cartridge 144 can enter the second bore to cause initiation of the cartridge 150 once the canopy has been unlocked.

The construction of the canopy unlocking mechanism 79 on the crew ejection seat is identical to the above described equivalent mechanism 26 on the captain's ejection seat.

Non-return valves 156 and 157 are interposed between the said inlet ports 25 and 27 and the interiors of the first and second bores within the body of the mechanism 26. A frangible diaphragm 158 is interposed between the outlet side of said non-return valve 157 and the piston 146. Likewise, a frangible diaphragm 159 is positioned between the outlet side of said non-return valve 156 and the piston 152.

Referring now to FIGURE 8, it will be seen that this figure shows a coupling very similar to the coupling shown in FIGURE 4. However, the coupling of FIGURE 8 includes an extra inlet port and a slight variation in the construction of the piston arrangement within the aircraft part of such coupling.

It will be seen that the aircraft part designated 160 includes a piston 161 for firing a gas-generating cartridge 162 provided in such part 160. Such piston 161 is, however, arranged to co-operate with a second piston 163 movement of which, in a direction away from said cartridge 162, causes axial movement of a piston 164 in the ejection seat part 165 of the coupling. Movement of said piston 164 will also cause movement of the piston 166 which is associated therewith. This piston 166 carries a firing pin 167 which, in turn, is adapted to strike a percussion-initiating cap on a cartridge 168, gas generated by such cartridge being adapted to pass from the part 165 into an elbow joint which constitutes an outlet port 75 connected to the conduit 76.

The inlet port 45 is positioned in the wall of the part 60 at a position between the piston 161 and piston 163. The inlet port 71, however, is positioned between the piston 164 and piston 166. Gas generated by the cartridge 162 is ducted to an elbow joint constituting the outlet port 48, such port 48 being attached to the conduit 51.

FIGURE 9 shows one of the rams 32, 33 and 82, 83, and such ram comprises a body 170 which has slidably positioned therein a piston member 171, such piston member being adapted to be forced to a position where the major part thereof extends outwardly from the body 170 by pressure fluid generated by a gas-generating cartridge 172 which is adapted to be fired by firing pin 173 positioned on a piston 174, a compression spring 175 being provided to bias the pin 173 away from the cartridge 172. A duct 176 is provided to place the said piston 174 in communication with an inlet port 177 which is closed by a frangible diaphragm 178 which is trapped between the body 170 and an elbow joint 179 connected to the appropriate conduits 30, 31 and 80, 81.

A compressible coil of metal 180 is provided to prevent or reduce shock waves from being transmitted to the body 170 by the piston 171 after such piston 171 has been forced outwardly from the body.

FIGURE 10 shows one embodiment of a non-return valve for example the non-return valve 65. This valve 65 has an inlet port 64 and an outlet port 66, pressure fluid being prevented from entering the outlet port 66 and passing through the valve to the inlet port 64 by a piston 181, such piston being spring-biassed into an outlet port closing position by a helical compression spring 182. It will be appreciated that this arrangement will not, however, prevent pressure fluid from entering the inlet port 64 and entering the valve and leaving the same through the outlet port 66. This flow of pressure fluid will be permitted because the piston 181 will be forced to an outlet port 66 opening position by the pressure fluid entering the inlet port 64.

The crash data recorder time delay unit shown in FIGURE 11 includes a piston 183 which rides in a bore 184 and such piston 183 is provided with a detent constituting a cam surface 185 upon which rides a pin 186 carried by a plunger 187, movement of said piston 183 by pressure fluid entering the inlet port 188 in one end of the bore 184 causing the pin 186 to depress said plunger 187 and thereby set in motion the time delay mechanism.

When the captain of the aircraft becomes aware of an emergency which, in his opinion, necessitates the complete abandoning of the aircraft, it is merely necessary for him to operate the handle 1 and both ejection seats of the ejection seat installation will be ejected from the aircraft.

On operation of the handle 1 the following sequences of events occur. Operation of the handle 1 causes a sear to be withdrawn from the pressure fluid generating device 2 and withdrawal of this sear causes a firing pin to strike the percussion-initiating cap of a cartridge within the device 2. Pressure fluid in the form of gas generated by the cartridge passes from the device 2 along the conduit 3 to the elbow joint 7 which is secured to the ejection seat part 4 of the coupling 5. Pressure fluid entering said elbow joint 7 causes a frangible diaphragm trapped between the elbow joint 7 and the body 106 to fracture and pressure fluid enters the counterbore 107.

Fracture of said diaphragm causes the piston 112 to be subjected to a pulse-like application of pressure fluid and the piston 112 moves in a direction against the action of the helical compression spring 115 to a position where the firing pin 114 strikes the percussion-initiating cap of the cartridge 109. Gas generated by such cartridge passes from the bore within the body 106, through an annular channel 110, and into the bore 111 of the elbow joint 8. This elbow joint 8 has a conduit 9 connected thereto which leads first to mechanisms for positioning the captain in his ejection seat correctly prior to ejection and then to ejection gun initiating mechanism. The said mechanisms for positioning the captain in his seat have been referred to hereinbefore.

Entry of pressure fluid into the counterbore 107 also causes the piston 113 to move away from the piston 112 and such movement causes the projection 117 to move the piston 122 axially within the counterbore 120 so that the gas-generating cartridge 127 is initiated. Pressure fluid generated by this cartridge 127 enters the annular outlet 128 which communicates with an outlet port 129 formed by a cranked joint which is connected to the conduit 10. Thus, during actuation of the various mechanisms for positioning the captain in his seat, pressure fluid is also passing down the conduit 10 to the T-junction 11, whereupon the pressure fluid passes into the conduit 12, through the non-return valve 13, into conduit 14 where it enters the inlet port 15 of a junction unit 16. Pressure fluid from this junction unit 16 passes into the bore within the elbow joint 142 (FIGURE 5) and causes fracture of the frangible diaphragm 143. Once the frangible diaphragm 143 has been fractured, pressure fluid will enter the booster unit 17 and will cause the piston 137 to move in such a manner that the cartridge 134 will be initiated and pressure fluid generated by such cartridge will enter the conduit 24.

The conduit 24 is connected to the inlet port 25 in the canopy unlocking mechanism 26 and will cause the movement of the piston 146 in a direction to cause firing of the cartridge 144. Firing of the cartridge 144 will cause pressure fluid to be generated which will cause axial movement of the plunger 148. In consequence, linkage associated with the plunger 148 will be moved and the canopy above the captain's ejection seat will be unlocked. Axial movement of the plunger 148 will uncover the port 153 and the pressure fluid generated by the cartridge 144 may pass from the port 153 and into the passage 154 which leads to the port 155. Pressure fluid entering the port 155 will cause the piston 152 to be depressed and the firing pin 151 carried thereby will cause initiation of the gas-generating cartridge 150.

Pressure fluid generated by this cartridge 150 passes through the outlet port 29 which is connected to conduits 30, 31 which are respectively connected to canopy jettisoning rams 32, 33. Pressure fluid passing down the conduits 30, 31 will enter the canopy jettisoning rams and will cause, after fracture of a frangible diaphragm 178, a cartridge 172 to be initiated by pulse-like application of pressure fluid on a piston therein. Initiation of such cartridge causes the piston 171 to extend and to cause jettison of the canopy above the captain's seat.

Furthermore, during the time that the captain is being positioned in his seat correctly for ejection and during unlocking and jettisoning of the canopy of his seat, pressure fluid entering the T-junction 11 has passed into the conduit 34 into the inlet port 35 of the booster unit 36 and has caused initiation of a gas-generating cartridge housed within such booster unit 36. Pressure fluid produced as a result of the initiation of such cartridge passes into the conduit 37 which is connected to the inlet port 38 of the T-junction 39. Such pressure fluid passes from such T-junction in two directions, namely into the conduit 41 and also into the conduit 44. Pressure fluid entering the conduit 41 passes to the crash data recorder time delay unit 42 whereupon such pressure fluid causes movement of the piston 153 which accordingly causes movement of the plunger 137 and initiates the unit 42.

In the meantime pressure fluid in the conduit 44 passes to the aircraft part 46 of the coupling 47 by way of the inlet port 45 constituted by an elbow joint. Pressure fluid entering the coupling 47 through the inlet port 45 causes the piston 163 to move axially and to cause corresponding movement of the piston 166. Movement of the piston 166 causes corresponding movement of the firing pin 167 which causes initiation of the cartridge 168 and pressure fluid generated by such cartridge passes to an outlet port 75, such outlet port 75 being connected to a conduit 76 which first passes to various mechanisms for positioning the occupant of the crew ejection seat correctly prior to ejection of the seat from the aircraft, and thence to the crew seat ejecting gun initiating mechanism.

Pressure fluid entering the coupling 47 through the inlet port 45 also causes movement of the piston 161 such that the gas-generating cartridge 162 is initiated and pressure fluid produced by such cartridge 162 enters the outlet port 48 which is connected to a conduit 51. This conduit 51 is connected to an inlet port 49 of a junction unit 50 and such pressure fluid passes into the outlet port 54 of this junction unit into a conduit 78 and into an inlet port 77 of the canopy unlocking mechanism 79.

Pressure fluid entering the mechanism 79 first causes actuation of a plunger therein (such plunger being equivalent to the plunger 148 of the mechanism 26) so that the canopy above the crew ejecting seat is unlocked. Subsequent to this unlocking of the canopy, pressure fluid is generated which passes into the conduits 80, 81 which are connected respectively to the rams 82, 83 which, on actuation, cause jettisoning of the said canopy over the crew ejection seat.

As has been stated above, the conduits 9 and 76, in addition to leading to mechanisms for positioning respectively the captain and the crew member in their ejection seats prior to ejection of the seats, also pass, and are connected, to the ejection gun-initiating mechanisms of the seats. The said initiating mechanisms may include safety means whereby the guns controlled thereby cannot be initiated prior to complete jettisoning the canopy or canopies thereover.

By choosing appropriately sized cartridges in the booster units 17 and 36 and appropriate cartridges in certain other mechanisms of the system and by the use of frangible diaphragms in conjunction with slow burning cartridges, the operation of the various mechanisms of the system are sequentially operated so that by operation of the handle 1 the crew member's canopy is unlocked and jettisoned just prior to unlocking and jettisoning of the captain's canopy and a time delay occurs after jettisoning the captain's canopy so that such canopy has cleared the ejection seat flight path of the crew ejection seat before the crew ejection seat is ejected from the aircraft. In this particular arrangement the crew ejection seat is ejected from the aircraft just prior to ejection of the captain's seat.

It will be appreciated from the above described arrangement that the captain and the captain's seat and crew seat can be ejected from the aircraft in a very short time by a single operation made by the captain of the aircraft.

It will be appreciated, however, that a situation, could arise in which the captain of the aircraft regards that there is a sufficient emergency to warrant ejection of his crew in the interests of their safety and in which the captain will himself require to remain in the aircraft. Thus, provision must be made whereby the crew seat of the system can be ejected by the occupant of such crew seat without causing ejection of the captain's ejection seat. To provide for this situation the crew seat is provided with a firing handle 74 which causes withdrawal of a sear from a gas-generating mechanism 73. Such removal of the sear causes a cartridge within the mechanism 73 to be initiated and pressure fluid generated by such cartridge will enter the conduit 72 and will pass into the inlet port 71 constituted by an elbow joint. Pressure fluid entering the inlet port 71 passes into the ejection seat part 70 of the coupling 47 and causes the piston 160 to initiate the cartridge 168 so that pressure fluid may pass into the outlet port 75 and into the conduit 76 to cause initiation of the mechanism for positioning the occupant of the crew seat correctly in the seat and also to cause initiation of the seat firing mechanism.

Entry of pressure fluid through the port 71 also causes movement of the piston 164 which is transmitted to the piston 163 and this movement is, in turn, transmitted to the piston 161 so that the cartridge 162 is initiated and pressure fluid enters the conduit 51 which is connected to the inlet port 49. Such pressure fluid passes from the inlet port 49 to the outlet port 54 of the junction unit 50 and into the conduit 78 so that the pressure fluid enters the canopy unlocking mechanism 79. Entry of this pressure fluid will, as has been described hereinbefore, cause unlocking and jettisoning of the canopy above the crew member ejection seat.

Thus, canopy unlocking and jettisoning and ejection of the crew seat can take place without affecting the captain's seat or the canopy above such captain's seat.

It is, on occasions, required to cause unlocking and jettisoning of either the canopy above the captain's seat and/or the canopy above the crew seat without initiating ejection of the seats from the aircraft. The unlocking and jettisoning of each canopy may be initiated by movement of the appropriate handles 22 and 56. Operation of the handle 22 will cause the sear 95 to be withdrawn from the piston 93 and such withdrawal causes initiation of the cartridge 91. Pressure fluid generated by this cartridge enters the conduit 20 and enters the junction unit 16 through an inlet port 19. This pressure fluid then causes firing of the cartridge 134 in the booster unit 17 and pressure fluid passes into the conduit 24 to cause operation of the canopy unlocking mechanism 26 and subsequent jettisoning of the canopy above the captain's seat.

Pressure fluid entering the inlet port 19 is restrained from entering other parts of the mechanisms by non-return valves 13 and 65 positioned at the ends of conduits 14 and 67 connected to inlet ports 15 and 18.

A very similar arrangement is arranged between the handle 56, pressure fluid generating device 55, conduits 57 and 78, and canopy unlocking mechanism 79. However, a non-return valve in the conduit 51 is not necessary as passage of pressure fluid entering this conduit 51 from the inlet port 49 cannot pass along the system after it has entered the outlet port 48 of the coupling 47.

The safety regulations laid down by the appropriate authorities necessitate means being provided externally of the aircraft for removal of the canopies positioned above the captain's and crew seats, and to satisfy these requirements the pressure fluid generating devices 68 and 86 are connected to manually-operable handles on the exterior of the aircraft.

Actuation of the handles associated with the pressure fluid generating device 68 causes pressure fluid to enter a T-junction 61 so that pressure fluid enters respectively conduits 62, 63. Pressure fluid entering the conduit 62 passes through the non-return valve 60 and into the inlet port 53 of the unit 50. Pressure fluid then passes into the conduit 78 and into the canopy unlocking mechanism 79 so that the canopy above the crew ejection seat is unlocked and is subsequently jettisoned. Similarly, pressure fluid in the conduit 63 enters the non-return valve 65 and passes into the conduit 67 which is connected to the inlet port 18 of the unit 16. Pressure fluid then causes operation of the booster unit 17 which will cause pressure fluid to enter the conduit 24 which passes to the canopy unlocking mechanism 26 so that the canopy above the captain's seat is unlocked and subsequently jettisoned.

In an instance where the pressure fluid generating device 86 is initiated pressure fluid will enter the T-junction 84 and such pressure fluid will enter the conduits 28 and 85. Pressure fluid in the conduit 85 also passes to the canopy unlocking and jettisoning mechanism 79 and pressure fluid in the conduit 28 passes to the canopy unlocking mechanism 26 so that canopy unlocking and subsequent jettisoning thereof will be provided.

I claim:

1. An ejection seat installation for ejecting a captain's ejection seat and a crew ejection seat, comprising
    (1) a pressure fluid circuit having a first branch and a second branch;
    (2) a first pressure fluid generating device in the first branch;
    (3) a first operating means operable from the captain's ejection seat for generating pressure fluid in said device, said pressure fluid flowing into the first branch;
    (4) a first coupling in the first branch having an inlet port and two outlet ports, the inlet port receiving the pressure fluid from the first pressure fluid generating device;
    (5) a first conduit leading from one of the outlet ports to an ejection initiating mechanism for the captain's ejection seat;
    (6) a second coupling in the first branch having two inlet ports and an outlet port, one of the inlet ports of the second coupling receiving pressure fluid from the other outlet port of the first coupling;
    (7) a second conduit leading from the outlet port of the second coupling to an ejection initiating mechanism for the crew ejection seat, whereby operation of the first operating means initiates ejection of the captain's and the crew ejection seat;
    (8) a second pressure fluid generating device in the second branch; and
    (9) a second operating means operable from the crew ejection seat for generating pressure fluid in the second pressure fluid generating device, said pressure fluid flowing into the second branch and the other inlet port of the second coupling receiving the pressure fluid.

2. The ejection seat installation of claim 1, comprising further pressure fluid generating devices in the first and in the second coupling.

3. The ejection seat installation of claim 1, further comprising a first canopy unlocking and jettisoning mechanism associated with the captain's seat and a second canopy unlocking and jettisoning mechanism associated with the crew seat; the second coupling also having another outlet port; the first branch including a first pressure fluid delivery conduit leading from the other outlet port of the first coupling to the first canopy unlocking and jettisoning mechanism and delivering pressure fluid thereto, and the first and second branches further including a common second pressure fluid delivery conduit leading from the other outlet port of the second coupling to the second canopy unlocking and jettisoning mechanism.

4. The ejection seat installation of claim 3, wherein each canopy unlocking and jettisoning mechanism includes a housing; a first plunger in said housing for causing unlocking of the canopy; a first cartridge within the housing for moving the first plunger relative to the housing for causing the unlocking of the canopy upon pressure fluid being generated by said cartridge; a second cartridge in said housing arranged to generate pressure fluid upon generation of the pressure fluid by the first cartridge; and a second plunger in the housing arranged to engage the canopy upon being axially moved in the housing by the pressure fluid generated by the second cartridge.

5. The ejection seat installation of claim 1 wherein each of said couplings comprises two parts releasably connected to each other.

6. The ejection seat installation of claim 5, wherein one of the coupling parts has an inlet port and the outlet port leading to the ejection initiating mechanism; a first pressure fluid source in said one coupling part arranged to generate pressure fluid upon delivery of pressure fluid through the inlet port into said one coupling part; a second pressure fluid source in the other coupling part arranged to generate pressure fluid upon delivery of the pressure fluid from the first pressure fluid source into the second coupling part; and an outlet port in the second coupling part for delivering the generated pressure fluid therefrom.

7. An ejection seat installation for ejecting a captain's ejection seat and a crew ejection seat, comprising
    (1) an actuating circuit having a first branch and a second branch;
    (2) a first coupling in the first branch having an outlet leading to an ejection initiating mechanism for the captain's ejection seat;
    (3) a first operating means operable from the captain's ejection seat for actuating the first branch of the circuit and thus to initiate the mechanism;

(4) a second coupling in the first branch arranged in series with the first coupling and having an outlet leading to an ejection initiating mechanism for the crew ejection seat, whereby operation of the first operating means also initiates the latter mechanism; and (5) a second operating means operable from the crew ejection seat for actuating the second branch of the circuit and thus to initiate the latter mechanism.

References Cited by the Examiner

UNITED STATES PATENTS

| 3,123,326 | 3/1964 | Kenyon | 244—122 |
| 3,180,593 | 4/1965 | Martin | 244—122 |
| 3,222,015 | 12/1965 | Larson et al. | 244—122 X |

MILTON BUCHLER, *Primary Examiner.*

B. BELKIN, *Assistant Examiner.*